(12) United States Patent
Wu et al.

(10) Patent No.: US 11,971,482 B1
(45) Date of Patent: Apr. 30, 2024

(54) SIX-DIMENSIONAL OPTICAL POSITION SENSOR

(71) Applicant: MLOptic Corp, Redmond, WA (US)

(72) Inventors: Sophia Shiaoyi Wu, Bellevue, WA (US); Gary Fu, Sammamish, WA (US); Sean Huentelman, Bellevue, WA (US); Wei Zhou, Sammamish, WA (US)

(73) Assignee: MLOptic Corp., Redmond, WA (US)

( * ) Notice: Subject to any disclaimer, the term of this patent is extended or adjusted under 35 U.S.C. 154(b) by 0 days.

(21) Appl. No.: 18/235,546

(22) Filed: Aug. 18, 2023

(51) Int. Cl.
*G06T 7/70* (2017.01)
*G01S 7/481* (2006.01)
*G01S 17/06* (2006.01)

(52) U.S. Cl.
CPC ............ *G01S 17/06* (2013.01); *G01S 7/4814* (2013.01); *G06T 7/70* (2017.01)

(58) Field of Classification Search
CPC .......... G01S 17/06; G01S 7/4814; G06T 7/70
See application file for complete search history.

(56) References Cited

U.S. PATENT DOCUMENTS

| | | | | |
|---|---|---|---|---|
| 9,460,479 | B1* | 10/2016 | Butler | .................... G06Q 50/08 |
| 2021/0279858 | A1* | 9/2021 | Stoppe | ............... G01M 11/0278 |
| 2022/0187471 | A1* | 6/2022 | Eshel | ..................... G01S 7/4865 |
| 2023/0194206 | A1* | 6/2023 | Davidson | ............... G02B 23/14 |
| | | | | 42/122 |

FOREIGN PATENT DOCUMENTS

WO WO-2022053874 A2 * 3/2022 ............. G01S 17/42

* cited by examiner

*Primary Examiner* — Shaghayegh Azima
(74) *Attorney, Agent, or Firm* — Jong Patent Firm; Cheng Ning Jong; Tracy P. Jong

(57) ABSTRACT

A system for providing six-dimensional position data of an object in a three-dimensional (3D) space, the system including a light source configured to emit a light beam in an x-direction, a mirror including a mirror plane disposed in an x-y plane and a beam splitter configured for reflecting the light beam from the light source onto the mirror before being directed to the object, the light beam reflected by the object onto the beam splitter before being directed through a lens to an image plane to form an image.

4 Claims, 9 Drawing Sheets

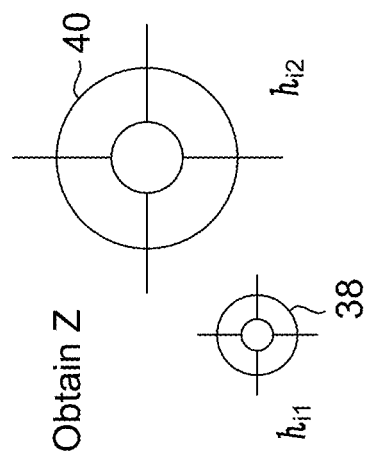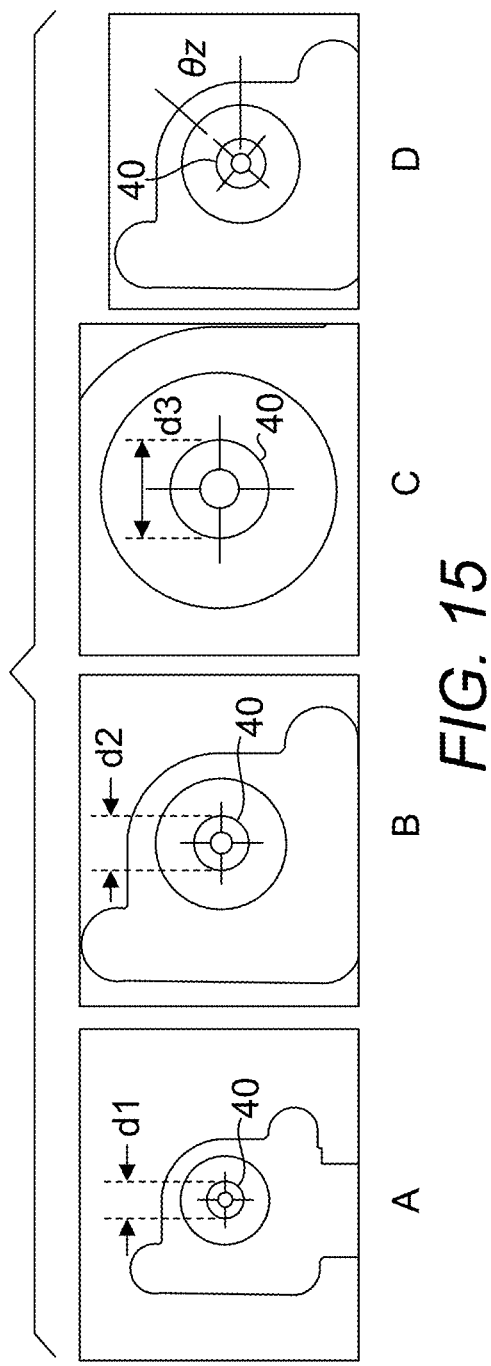

SIX-DIMENSIONAL OPTICAL POSITION SENSOR

BACKGROUND OF THE INVENTION

1. The Field of the Invention

The present invention relates to an optical position sensor. More specifically, the present invention is directed to a six-dimensional (6D) optical position sensor.

2. BACKGROUND ART

Emerging applications that will considerably impact our future include, but not limited to, virtual and augmented reality (VR/AR), automation and space technology, etc. For successful implementation of applications in VR/AR, a six-dimensional (6D) sensing capability is required to precisely detect a target's position while intelligently determining movements. For example, in the Metaverse, a new verse or world that uses VR/AR, each involved individual and related devices need to perceive exactly the targets' locations and attitudes in both real and virtual environments. In the field of automation, e.g., self-driving vehicles and robotics, a 6D sensing capability enables the machines to make correct and precise decisions with or without minimal human inputs to complete the tasks. In space missions, e.g., space docking, planetary landing, obstacle avoidance and free-space communications, it is critical to have a compact sensor integrated with multiple functions and multi-dimensional sensing capabilities due to weight limitations and size restrictions. Certain sensing requirements are also essential to ensuring the proper functioning of these emerging applications, e.g., high-resolution, high-speed, environmental stability, multi-function, large ranges and no moving parts. However, these requirements have proven challenging to be met in current commercially-available sensors. Conventional techniques are used in many commercially-available sensors, e.g., electronic and magnetic sensors, etc. However, such sensors may suffer from the lack of multiple sensing capabilities, limited sensing range and low speed, etc. Some of these sensors are one-dimensional sensing devices and have short sensing distances, leading to their inability in sensing distances due to the lack of necessary responses to probing signals from their environments. Further, electronic and magnetic sensors are also vulnerable to electric and magnetic fields, which can cause sensor malfunction and system damage. Ultrasonic transducers and sensors produce results of low resolution at low speeds, resulting in less and delayed information transmitted. Sound waves are required for ultrasonic transducers/sensors to function and therefore these transducers/sensors cannot function in vacuum and space environments. Further, mechanical and displacement sensors are invasive sensors as contact is required for displacements to be measured. Such sensors are therefore inconvenient and their use is impossible in an environment unsafe for humans. Such sensors also require moving parts, which can wear out and cause mechanical failures much more rapidly than non-contact sensors. Emerging applications require sensors that work in variable and unpredictable environments with multiple dimensions. Therefore, the sensors must have multiple functions, wide sensing ranges, high-resolution and speed.

There exists a need for a high-resolution, high-speed, non-contact, multi-dimensional distance sensor that is also compact, with low part count and inexpensive to procure, use and maintain.

SUMMARY OF THE INVENTION

In accordance with the present invention, there is provided a system for providing six-dimensional position data of an object in a three-dimensional (3D) space, the system including:
(a) a light source configured to emit a light beam in an x-direction;
(b) a mirror including a mirror plane disposed in an x-y plane; and
(c) a beam splitter configured for reflecting the light beam from the light source onto the mirror before being directed to the object, the light beam reflected by the object onto the beam splitter before being directed through a lens to an image plane to form an image,
wherein in a known position and orientation of the object, the image is provided as a first image and in a second position and orientation of the object, the image is cast as a second image, a first distance (x) is determined based on an image shift of the second image from the first image and a magnification of the second image with respect to the first image, a second distance (y) is determined based on an image shift of the second image from the first image and a magnification of the second image with respect to the first image, a third distance (z) between the object and an image plane along an axis perpendicular to the mirror is determined based on a magnification of the second image with respect to the first image, and each of a first angle of rotation ($\theta_x$) and a second angle of rotation ($\theta_y$) is determined based on a ratio of the x-component length and the y-component length of the second image relative to the first image and a third angle of rotation ($\theta_z$) is determined based on a rotation of the second image with respect to the first image.

In one embodiment, the object is a target plane including a reticle. In one embodiment, the reticle includes a first rectilinear line and a second rectilinear line disposed at a right angle to the first rectilinear line. In one embodiment, the reticle includes a cross. In one embodiment, the system further includes a rail system including two ends, wherein a distance between the two ends of the rail system is configured to be adjustable, the image plane is disposed on a first end of the rail system and the target plane is disposed on a second end of the rail system. In one embodiment, the reticle is disposed on the target plane and the target plane is configured to be rotatable about an axis perpendicular to the target plane. In one embodiment, the light source is laser. In one embodiment, the system further includes a camera within which the lens and the image plane are disposed.

An object of the present invention is to provide a non-contact multi-dimensional high-speed and high-resolution position sensor.

Another object of the present invention is to provide a non-contact six-dimensional (6D) high-speed and high-resolution position sensor.

Another object of the present invention is to provide a non-contact position sensor not susceptible to electric and magnetic fields and the lack of atmosphere.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 13 is a diagram depicting an image plane upon which two images are produced with a target disposed at different distances from the image plane.

FIG. 14 is a diagram depicting an image plane upon which two images are produced with a target disposed at different orientations about a z-axis.

FIG. 15 is a diagram depicting a series of second images obtained from a target disposed at various distances in diagrams A-C and at a different orientation about a z-axis in diagram D.

PARTS LIST

Figure 1:
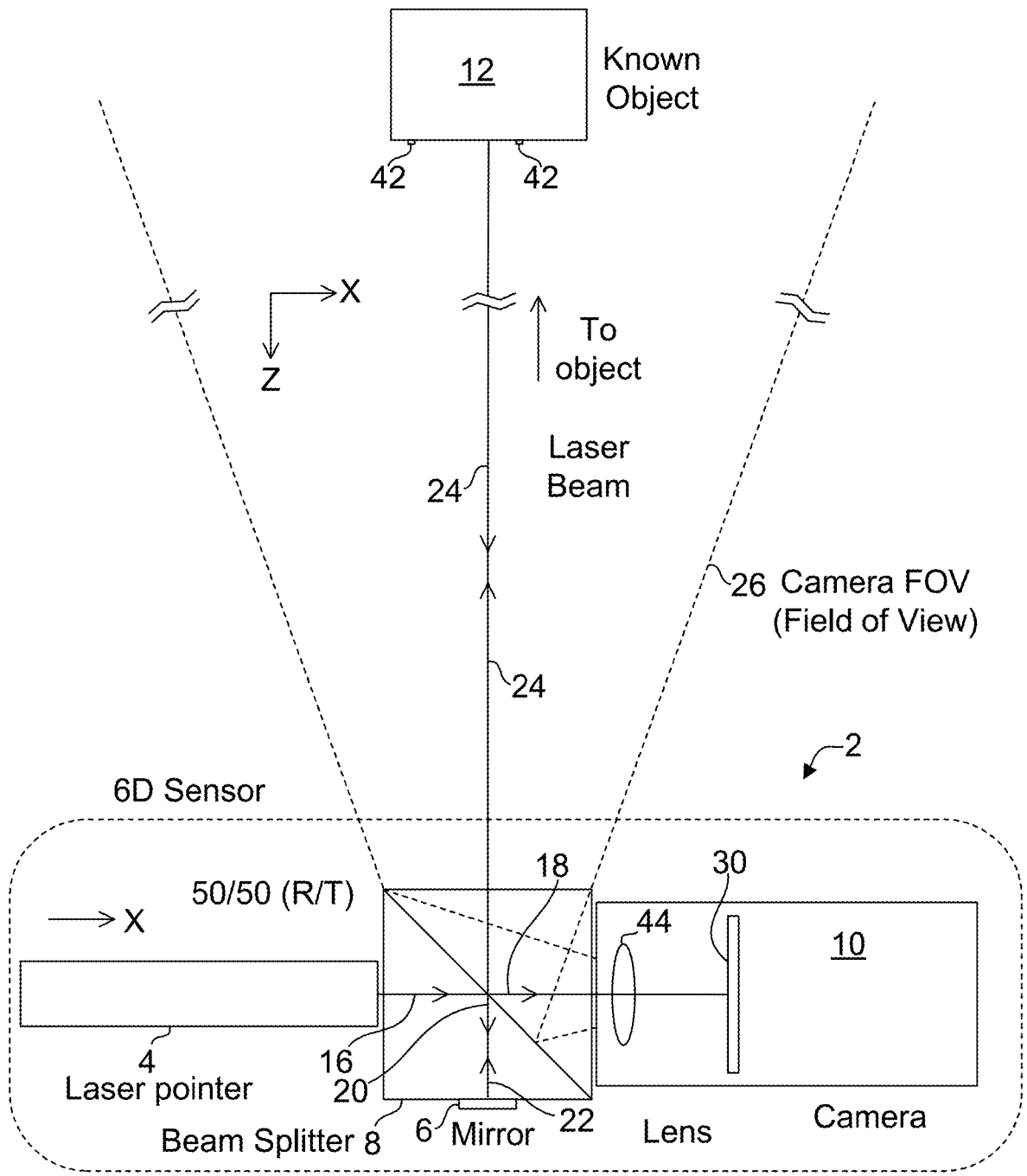
FIG. 1 is a diagram depicting one embodiment according to a present system or position sensor in which a combination of optical imaging and laser techniques are utilized.

2—position sensor or system for providing position data
4—light source, e.g., laser
6—reflecting surface, e.g., mirror
8—beam splitter
10—image capture device, e.g., camera
12—object or target plane
14—rail system
16—light beam from light source
18—transmitted light beam from light source and reflected light beam from target plane, if available
20—reflected light beam from light source
22—reflected light beam from mirror
24—transmitted light beam from mirror
26—camera field of view (FOV)
28—reticle
30—image plane
32—first rectilinear line
34—second rectilinear line
36—cross
38—first image
40—second image
42—marker
44—lens
46—focal point
48—focal length
50—object's distance from lens
52—image distance from lens
54—focused spot cast by transmitted light beam
56—focused spot cast by reflected light beam
58—angle of rotation about an axis
60—rail

PARTICULAR ADVANTAGES OF THE INVENTION

The present system offers advantages that outweigh position measurements offered by electronic, magnetic and ultrasonic sensors. It combines optical imaging and laser techniques to provide the full capability of six-dimensional (6D) sensing with only one sensor, covering a wide range for both near and far fields with both high spatial and angular resolutions to facilitate technical advancements in fields including, but not limited to, metrology, defense, biomedicine and scientific research. The capabilities of the sensor can easily be extended by modifying the optics and laser or exploiting new optical components. The sensor deals with the behavior of optical waves which are combinations of high-frequency electrical and magnetic fields in the wavelength ranging from infrared (700 nm-several microns) through visible light (400 nm-700 nm) to ultraviolet (<400 nm) light. Due to their extremely short wavelength and speed of light ($3\times10^8$ m/s), they are one of the most ideal candidates for high-resolution and high-speed sensing, communications, measurements, and processing. With a small macro-type lens, the sensor can detect three-dimensional translations of an object in both near and far fields. The laser beam as utilized in the system is capable of precisely pointing at the target and detecting the angular information from the target. The sensor can be easily upgraded to extend its capability by exploiting different optics for broad applications. For example, a wide-angle lens can be used for large area monitoring and surveillance and a telescopic lens can be used for high-resolution measurements at a distance. A small diode laser or fiber laser can be coupled with microscopic lens for micro-level applications such as integrated circuit, microfabrication and inspections. In addition to the above six degrees of freedom, the sensor has the potential to detect additional information such as the speed and acceleration of the target for both linear translation and rotation, by simply recording and using time-lapsed events.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
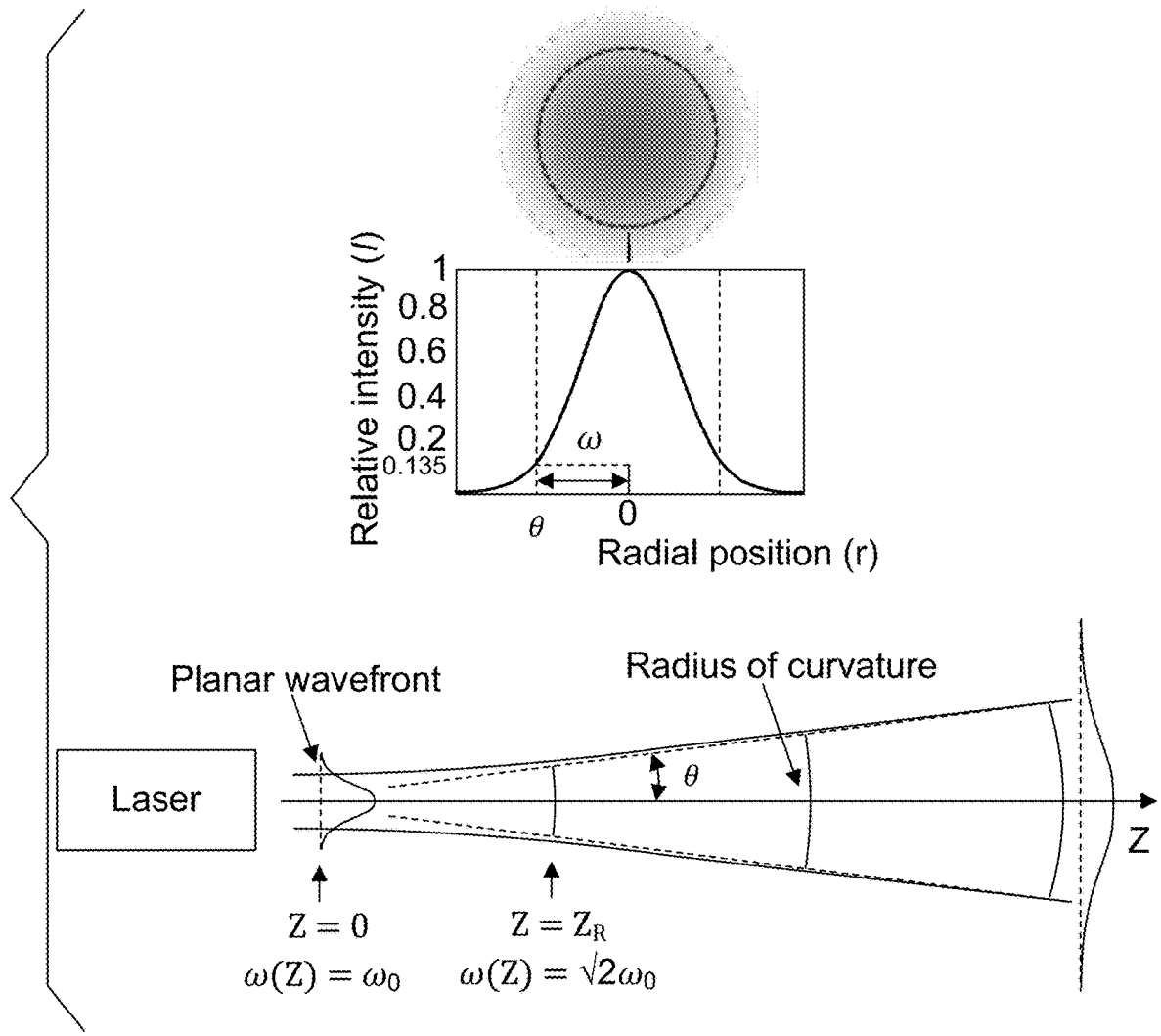
FIG. 2 is a diagram depicting an irradiance profile and divergence angle of a Gaussian laser beam.

FIG. 1 is a diagram depicting one embodiment according to a present system or position sensor in which a combination of optical imaging and laser techniques are utilized. The system 2 provides six-dimensional (6D) position data of an object 12 in a three-dimensional (3D) space. A location within the 3D space is represented with x, y and z where x is a distance in the x-direction, y is a distance in the y-direction and z is a distance in the z-direction, $\theta_x$ is an angle of rotation about an x-axis, $\theta_y$ is an angle of rotation about a y-axis and $\theta_z$ is an angle of rotation about a z-axis and x, y and z-axes are disposed at right angles from one another. The term "x-direction" is used herein to mean a direction that is parallel to an x-axis and agnostic of its heading. The term "y-direction" is used herein to mean a direction that is parallel to a y-axis and agnostic of its heading. The term "z-direction" is used herein to mean a direction that is parallel to a z-axis and agnostic of its heading. The system includes a light source 4, e.g., laser, e.g., laser embodied in a laser pointer, a mirror 6 and a beam splitter 8. The light source 4 is directed towards the beam splitter 8, which divides the light beam 20 by 50/50 (reflection/transmission) split through a 45° slanted thin layer inside the cube prism of the beam splitter 8. The light beam 20 is aligned with the center of the cube prism. The light source 4 is configured to emit a light 16 in an x-direction, e.g., parallel to the x-direction. The mirror 6 includes a mirror plane disposed in an x-y plane. It shall be noted that the mirror may be attached to the bottom surface of the beam splitter so that the laser beam directed by the mirror is vertically pointing to the object 12. The beam splitter 8 is configured for reflecting a light beam 20 from the light source 4 onto the mirror 6 before being directed via light beam 24 to be incident upon the object 12, the light beam reflected by the object 12 onto the beam splitter 8 before being directed through a lens 44 to an image plane 30 to form an image. A portion of the light beam 20 is also transmitted through the beam splitter as light beam 18 and cast onto the image plane 30. In the embodiment shown, the system may include a camera 10 within which a lens 44 and the image plane 30 are disposed. Another image capture device may be used as long as images captured on the image plane 30 can be made available in a digital form such that automatic processing of the images for locations, distances, magnifications of one digital object relative to another as well as other information can be computed using a controller. The camera 10 is aligned with its lens optical axis overlapping the light beam 18 cast on the image plane 30. The beam splitter 8 therefore combines optical imaging and laser pointing to a single optical path. A small macro-type lens 44 may be used in the camera 10 which makes the system capable of both close-up and far-field imaging and the light source 4 is coaxially disposed with the lens 44. The light beam is useful for detecting angular movements $\theta_x$ and $\theta_y$ from the target based on the highly collimating nature of light beams, laser, throughout and is capable of precisely pointing at targets from near to far fields such that the exact location and the attitudes of an object can be determined using the present system as disclosed elsewhere herein. FIG. 2 is a diagram depicting an irradiance profile and divergence angle of a Gaussian laser beam. The present system is based on the principles of both optical imaging and laser collimating for detection of target's location and attitudes. Laser light is highly collimated because it is formed in an optical cavity between two parallel reflectors which constrain all the light propagating in one direction perpendicularly to the mirror surfaces. In Physics, the laser beam is assumed to be Gaussian with an irradiance profile as shown in FIG. 2 that follows an ideal Gaussian distribution which is symmetric around the center of the beam and decreases as the distance from the center of the beam perpendicular to the direction of propagation increases. This distribution is described by:

$$I(r)=I_0 \exp(-2r^2/(\omega(z)^2))$$

where $I_0$ is the peak irradiance at the center of the beam, r is the radial distance away from the axis, $\omega(z)$ is the radius of the laser beam where the irradiance is $1/e^2$ of $I_0$ and z is the distance propagated from the plane where the wavefront is flat. The laser collimation can be determined by the beam divergence angle $\theta$, which can be calculated by using the following equation:

$$\theta=\lambda/(\pi\omega_0)$$

$\omega_0$ is called the beam waist where the laser beam diameter reaches a minimum value, where $\lambda$ is the wavelength of the laser. Since $\lambda$ is only about hundreds of nanometers, the laser divergence is very small. For example, a 500 nm green laser (a human eye is most sensitive to the wavelength around 500 nm) with a diameter of 0.5 mm, $\theta\approx0.037$ degrees. The divergence of small laser beams is common in this range, which is highly collimated. The laser collimation can be easily and further improved by using a collimating lens to increase the beam diameter wo or using a bigger laser. In one example, the collimating accuracy of our laser pointer is approximately 0.057 degrees (or about 1 mrad). The laser collimating stability is <0.0002 deg/C.

The object 12 can be a known object of known dimensions or has known markers 42 useful for serving as a baseline for measurement calculations, in addition to other dimensions of the object such that a magnification can be determined. In many applications, the object or target size is known, e.g., cars, planes, man-made space objects, e.g., known satellites, space station, planets in our solar system, e.g., the Earth, Mars and moon, etc. For instance, if the width of the object 12 is known to be 60 inches, an image of the object having a width of 6 inches on the image plane 30 will be considered to be disposed at a magnification of ‰ or 0.1. The known quantities of the object 12 may be provided to facilitate calculations involving the magnification value. Additionally, an image 38 of the baseline may be superimposed on the same image plane 30 to provide a visual contrast to a second image 40 for which new position data is sought. In some cases, however, the target size is unknown, e.g., an unidentified space object, an unidentified vehicle and a naturally occurring item, e.g., a boulder, etc.

Using the calculated magnification disclosed elsewhere herein, the dimensions of an unknown object disposed at the same distance from the present system can be estimated.

Figure 3:
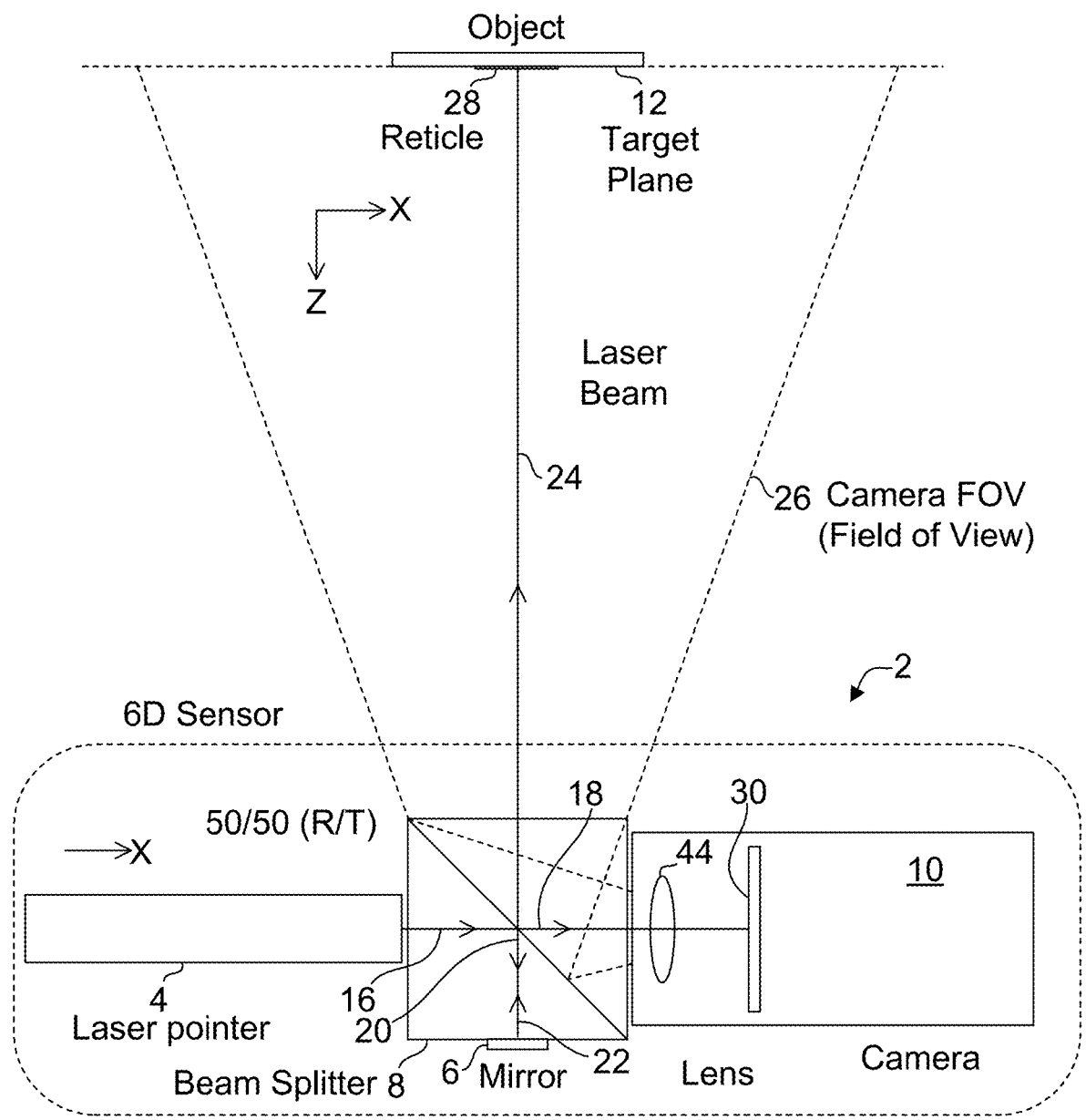
FIG. 3 is a diagram depicting one embodiment according to a present system or position sensor in which a combination of optical imaging and laser techniques are utilized.

FIG. 3 is a diagram depicting one embodiment according to a present system or position sensor in which a combination of optical imaging and laser techniques are utilized. If it is inconvenient or impossible to integrate a target plane with an object, the object for which position data is to be provided may be attached to the target plane 12 at a known offset. Therefore, position data of the object can be resolved using the spatial relationship of the object relative to the target plane 12. The system includes a light source 4, e.g., laser, a mirror 6, a beam splitter 8 and a target plane 12. The light source 4 is configured to emit a light beam 16 in an x-direction, e.g., parallel to the x-direction. The mirror 6 includes a mirror plane disposed in an x-y plane.

Figure 16:
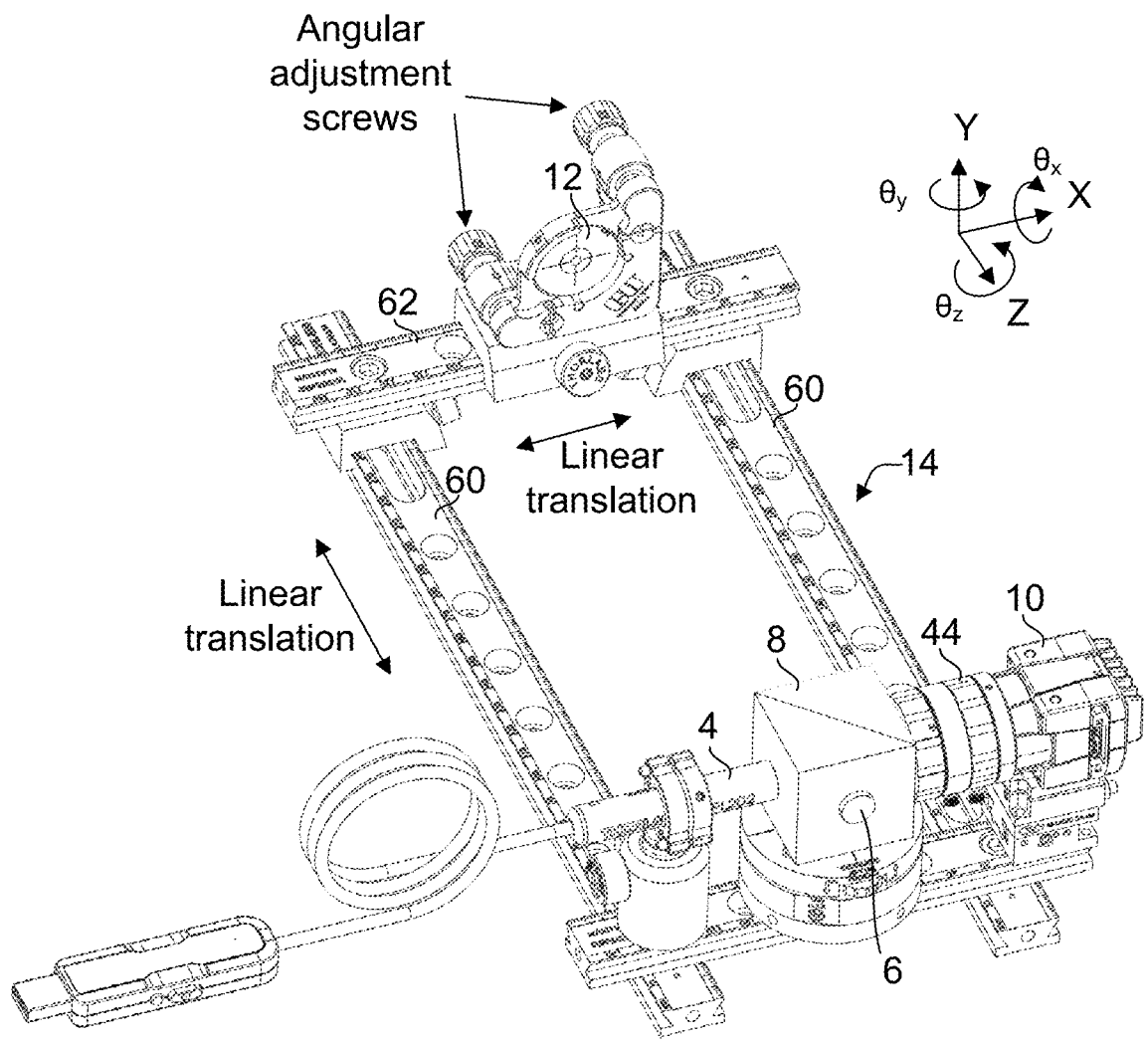
FIG. 16 is a diagram depicting a present system adapted to a rail system including two ends, wherein a distance between the two ends of the rail system is configured to be adjustable, the image plane is disposed on a first end of the rail system and the target plane is disposed on a second end of the rail system.

The beam splitter 8 is configured for reflecting a light beam 20 from the light source 4 onto the mirror 6 before being directed via light beam 24 to be incident upon the target plane 12, the light beam reflected by the target plane 12 onto the beam splitter 8 before being directed to an image plane 30 to form an image. Again, a portion of the light beam 20 is also transmitted through the beam splitter as light beam 18. In the case where a reticle is not used in conjunction with the target plane 12, this transmitted light beam can serve as a datum where a shift from this datum can indicate displacements in the x and y-direction. In one embodiment, the target plane 12 is disposed at a known position, e.g., as established using another mechanism, e.g., ruler, etc., and known orientation, e.g., as established using another mechanism, e.g., protractor, etc., of the target plane 12 and the image is provided as a first image 38 that serves as a baseline. Upon establishing the baseline and when the target plane 12 is disposed in a second position and orientation, the new position data can be determined from an image cast as a second image 40. In one embodiment, the reticle 28 includes a first rectilinear line 32 and a second rectilinear line 34 disposed at a right angle to the first rectilinear line 32. In one example, the reticle includes concentric circles of diameter of about 3.4 mm and about diameter 9.4 mm, respectively. With a set of lines disposed at a right angle to one another, e.g., in the first and second rectilinear lines 32, 34 or the cross 36, a rotation and the magnitude of rotation of the second image 40 with respect to the first image 38 can be ascertained. In one embodiment, the system 2 may be disposed on a rail system as shown in FIG. 16 to facilitate the use of the system 2.

A first distance in the x-direction is determined based on an image shift of the second image from the first image and a magnification of the second image with respect to the first image. Likewise, a second distance in the y-direction is determined based on an image shift of the second image from the first image and a magnification of the second image with respect to the first image. A third distance in the z-direction between the target plane 12 and an image plane 30 along an axis perpendicular to the mirror 6 is determined based on a magnification of the second image with respect to the first image. Each of a first angle of rotation ($\theta_x$) and a second angle of rotation ($\theta_y$) is determined based on a ratio of the x-component length and the y-component length of the second image relative to the first image. A third angle of rotation ($\theta_z$) is determined based on a rotation of the second image with respect to the first image. It shall be noted that the position data obtained with the presence of a target plane 12 is the position data of the target plane 12. If the position data of a secondary object is desired, the secondary object may be attached to the target plane 12 to ensure that any positional and orientational changes to secondary object can be resolved using a positional offset that relates the secondary object to the target plane 12.

Figure 4:
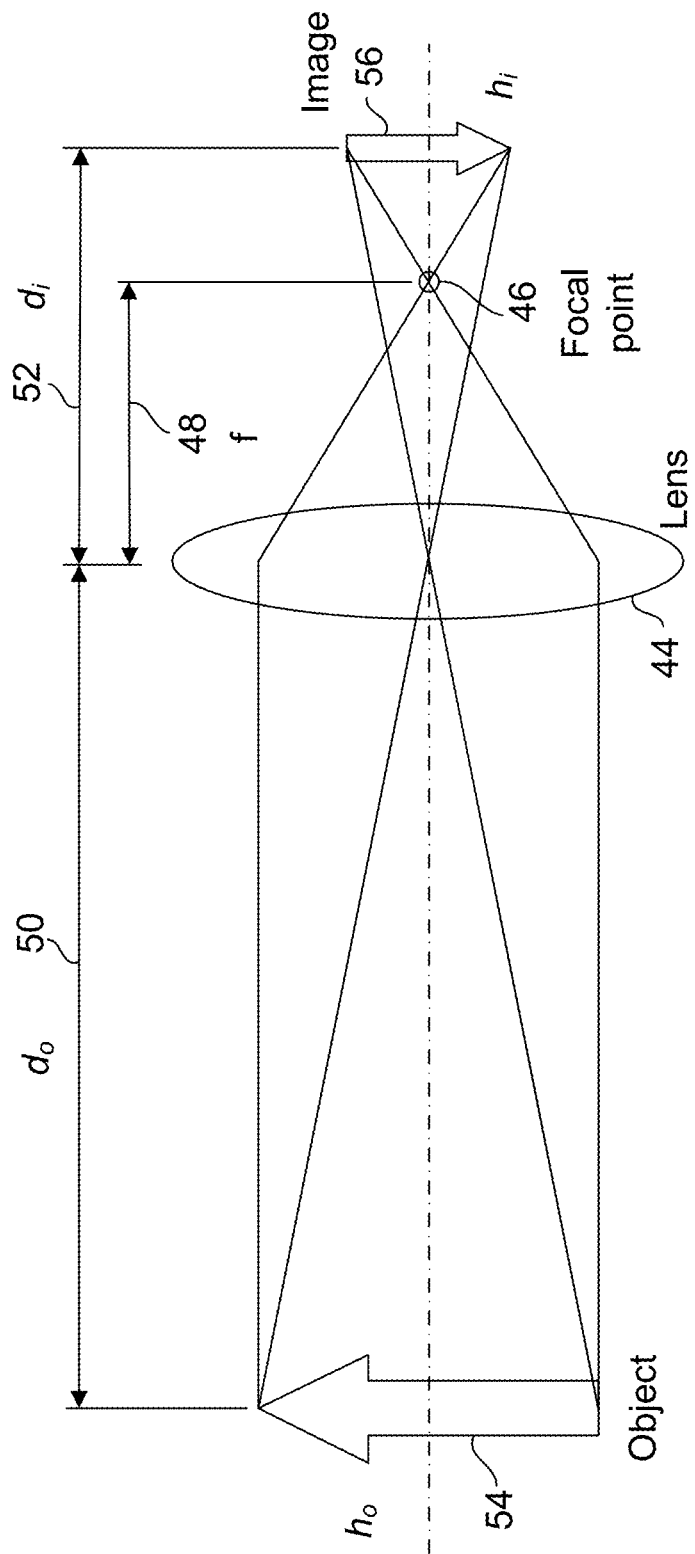
FIG. 4 is a ray diagram depicting optical imaging principles.

FIG. 4 is a ray diagram depicting optical imaging principles. There are two fundamental rules of refraction for an optical lens to be considered in determining the image location, size, orientation, and type when an object is positioned in front of a lens. The first fundamental rule states that a ray traveling parallel to the lens axis will refract or change angles, towards the lens focal point 46 where the collimated light focuses. The second fundamental rule states that a ray incident to the lens center will continue to travel in the same direction. FIG. 4 depicts the manner in which these two rules are applied in a standard optical imaging system and the image's location, size, orientation and type when an object is positioned in front of a lens 44.

A relationship between the object's distance 50 from the lens ($d_o$), image distance 52 from the lens ($d_i$), and the lens focal length 48 ($f$) can be represented by:

$$1/f = 1/d_i + 1/d_o \qquad \text{Equation 1}$$

The magnification (M), the ratio of image height ($h_i$) and object height ($h_o$) can be related as follows:

$$M = h_i/h_o = -d_i/d_o \qquad \text{Equation 2}$$

From Equations 1 and 2, Equation 3 can be obtained:

$$d_o = f(1 - 1/M) \qquad \text{Equation 3}$$

Therefore, the lens 44 can indicate the location of an object if some parameters are known, e.g., the magnification M and the lens focal length f.

Figure 5:
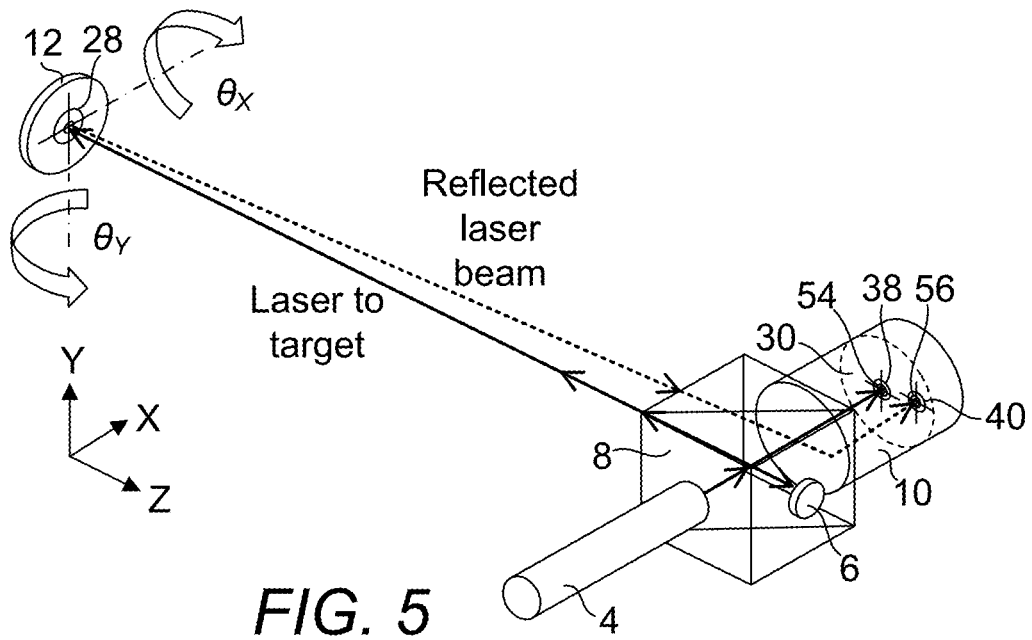
FIG. 5 is a diagram depicting a setup in which translations in an x-direction and a y-direction and rotations about an x-axis and a y-axis are determined.
Figure 6:
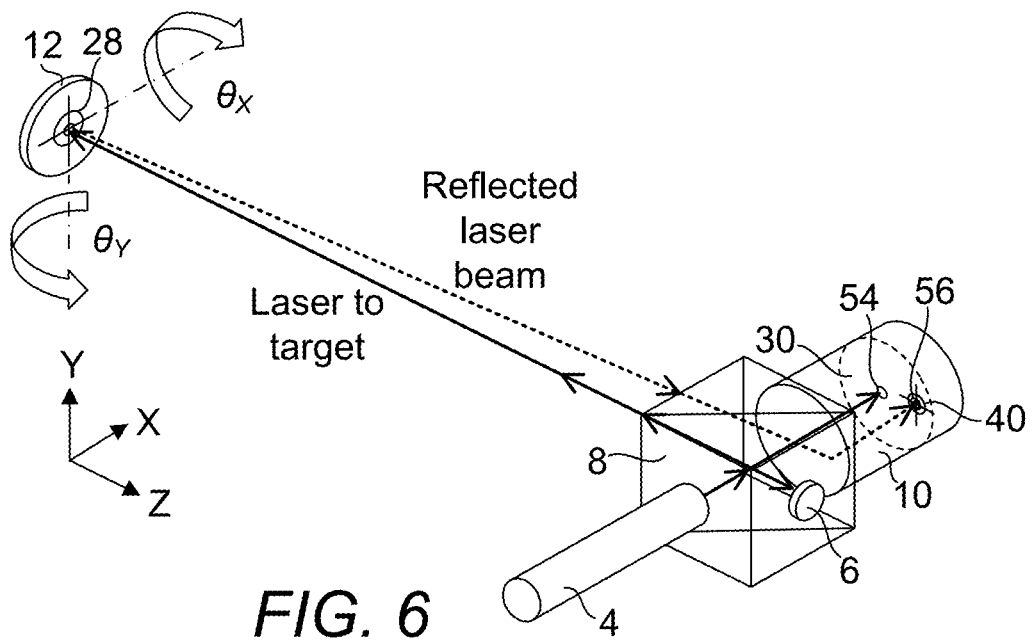
FIG. 6 is a diagram depicting a setup in which translations in an x-direction and a y-direction and rotations about an x-axis and a y-axis are determined.
Figure 7:
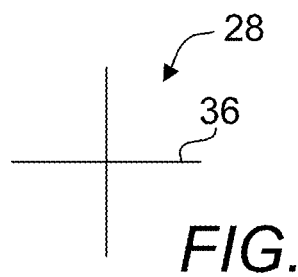
FIG. 7 is a diagram depicting another embodiment of a reticle suitable for use with a present target.
Figure 8:
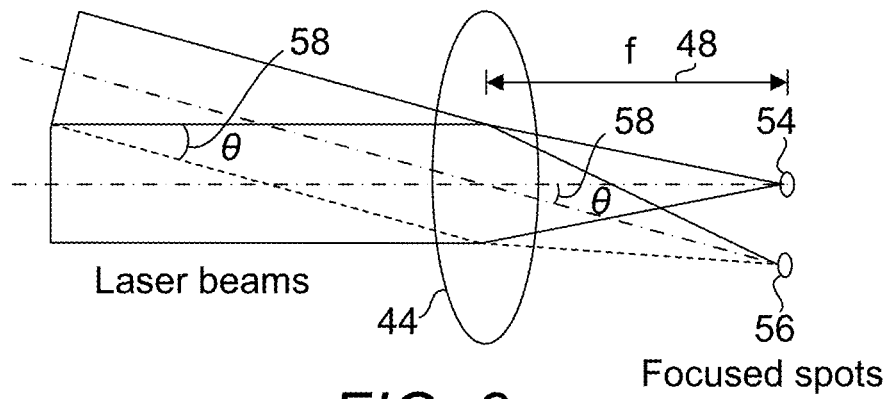
FIG. 8 is a diagram depicting the target angular information based on the location of focused spots of collimated laser beams.
Figure 9:
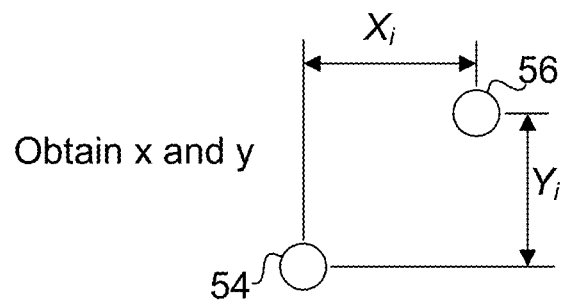
FIG. 9 is a diagram depicting data collected on an image plane useful for receiving focused spots due to reflected and transmitted light beams cast on the image plane.

FIG. 5 is a diagram depicting a setup in which translations in an x-direction and a y-direction and rotations about an x-axis and a y-axis are determined. It shall be noted that focused light beams 54, 56 are shown cast on an image plane 30 and a first image 38 (of the reticle 28) is shown superimposed on the same image plane 30. FIG. 6 is a diagram depicting a setup in which translations in an x-direction and a y-direction and rotations about an x-axis and a y-axis are determined. Here, the first image 38 of FIG. 5 is not shown superimposed on the image plane 30. However, the focused light beam 54, a result of light beam transmission through the beam splitter 8 is still present and it serves as a baseline location on the image plane 30 for which the position of the second image 40 is based. In this embodiment, the object is a target plane 12 which includes a reticle 28. The reticle 28 is disposed on the target plane 12 and the target plane 12 is configured to be rotatable about an axis perpendicular to the target plane 12. FIG. 7 is a diagram depicting another embodiment of a reticle suitable for use with a present target, e.g., a cross 36. FIG. 8 is a diagram depicting the target angular information based on the location of focused spots of collimated laser beams to facilitate the understanding of the manner in which angular information can be obtained from the present system. It shall be noted that when a light beam of a light source 4 is disposed at an angle that is not a right angle to a lens 44 of, e.g., a camera 10, the light beam is disposed at a rotation angle 58 that is non-zero. This rotation angle 58 can be resolved with respect to the x-axis or the y-axis to yield $\theta_x$ and $\theta_y$, respectively. As shown in FIGS. 5 and 6, when an object or target 12 moves within the camera field of view (FOV) 26, its image changes depending on the motion. FIG. 9 is a diagram depicting data collected on an image plane useful for receiving focused spots 54, 56 due to reflected and transmitted light beams cast on the image plane. No first and second images 38, 40 are shown here. The xy translations can be obtained based on the image shift ($x_i$, $y_i$) and the lens magnification M. Based on Equation 2, x and y can be resolved as follows in Equation 4:

$$x = x_i/M, y = y_i/M \qquad \text{Equation 4}$$

Figure 10:
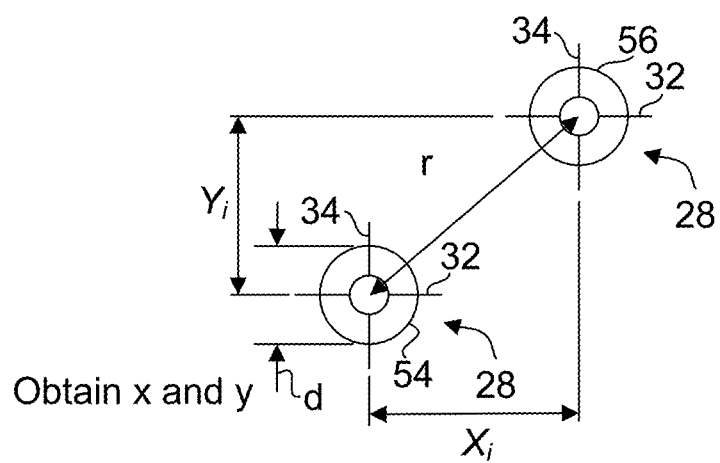
FIG. 10 is a diagram depicting data collected on an image plane useful for receiving first and second images due to reflected light beam cast on the image plane.

FIG. 10 is a diagram depicting data collected on an image plane useful for receiving first and second images due to reflected light beam cast on the image plane.

Figure 12:
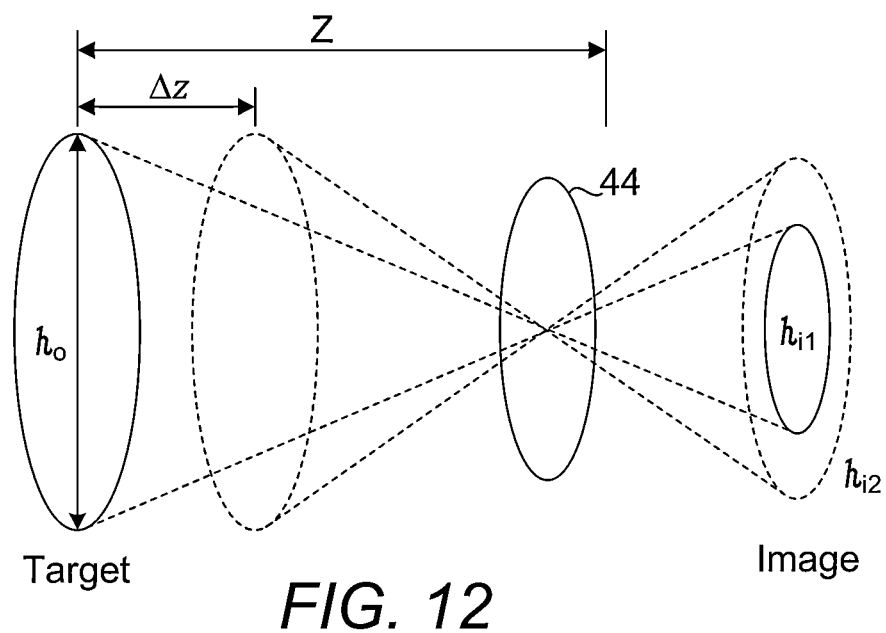
FIG. 12 is a diagram depicting the effects of disposing an object at various distances relative to a lens.

Referring back to FIG. 4, a collimated beam is focused on the focal point of a lens. Two collimated beams with different angles are focused at different locations on the camera imaging plane as shown in FIG. 8. Therefore, the spatial location of the focused spots on the camera image plane represent the target angular information. Collimated rays, e.g., a laser beam, can be considered as light coming from a point light source very far away which is a perfect collimated light. It shall be noted that this is different from the manner in which xy translations are obtained where the camera is directed to receive light at a certain distance rather than at infinity. To obtain angular information of incoming light beam, the camera is required to be focused at infinity. The collimating light beam can be considered as light rays coming from a spot light source located far away, i.e., at infinity. As such, to detect the spot light, the camera needs to be focused at infinity. Once the camera is focused at infinity, the image on the image plane or camera sensor becomes a tiny spot. Infinity focus is a camera setting that allows a lens to focus on a distance sufficiently far away that incoming rays of light are functionally parallel and reach the camera sensor as points. From the spatial offset of focused points, the beam incident angles can be calculated as follows:

$$\theta_x = \tan^{-1}(x_f/f)$$

$$\theta_y = \tan^{-1}(y_f/f)$$

where f is the focal length of the lens. When the laser beam is turned on, the camera can detect a bright spot. By adjusting the laser tip/tilt angle or the orientation of the light beam at the light source, the laser spot can be located at the center of the camera image. This means the laser beam and optical axis of the camera lens are superposed. The beam splitter is then aligned so that the laser is incident perpendicularly to the first surface center of the glass cube and then emerged from the last surface center of the cube after being reflected by a 45-degree middle layer and the attached mirror. This ensures that the laser beam passes through the two cross-central lines of the beam splitter 8. For $\theta_x$ and $\theta_y$ detection, the camera is required to be focused at infinity (on objects disposed at a distance of at least about 10 m) since it is used to sense the angular information rather than the spatial information of the target. As shown in FIG. 12, once the lens is focused at infinity, the target becomes very blurry but the far field is sharp. Next, the light source 4 or laser beam is turned on and directed at the target which reflects the laser beam partially back to the camera. If the target has no tip/tilt angle, the laser beam will be retro-reflected to the camera center. However, if there is a tip/tilt rotation from the target, the laser beam will be offset from the image center, as shown in FIG. 14. It shall be noted that the camera exposure time is automatically set to be very short as the focused laser spots on camera are bright. As such, only two laser spots are clearly shown while background is completely underexposed (dark). In one example, from the captured image, the laser spot offsets can be obtained:

$$x_f = 387 \text{ pixels} * 3.45 \text{ um} = 1.335 \text{ mm}$$

$$y_f = 540 \text{ pixels} * 3.45 \text{ um} = 1.863 \text{ mm}$$

where 3.45 um is the pixel size for the present image plane. Therefore, the angular shifts of the target are:

$$\theta_x = \tan^{-1}(x_f/f) \approx 3.06°$$

$$\theta_y = \tan^{-1}(y_f/f) \approx 4.26°$$

Figure 11:
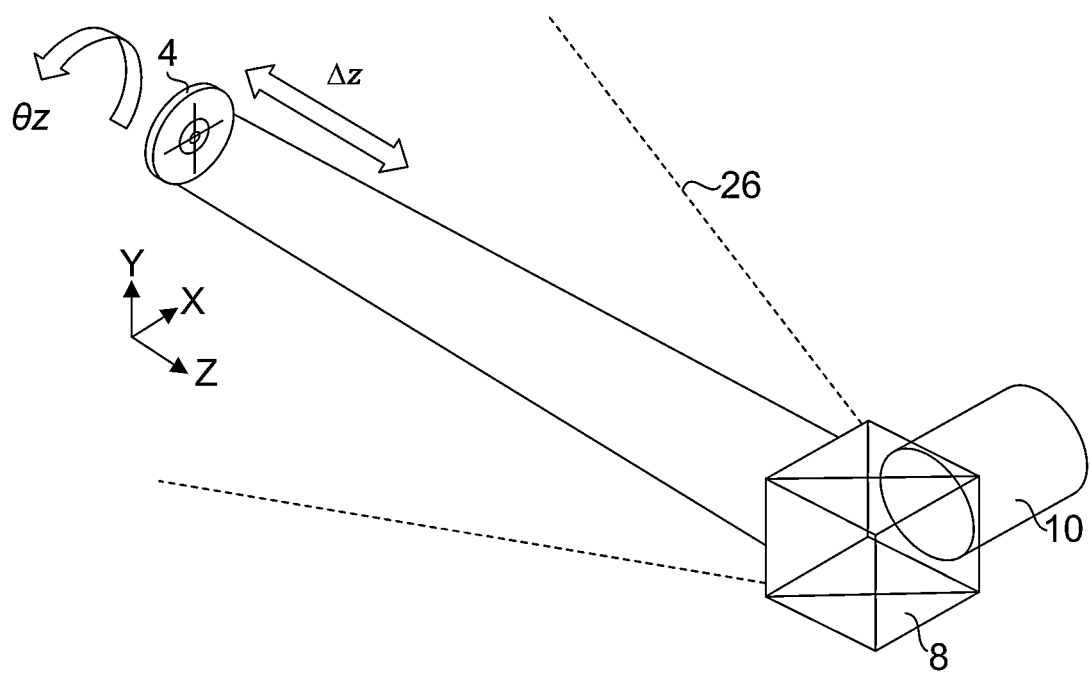
FIG. 11 is a diagram depicting the portions of a present system useful for providing position data in the z-direction.

FIG. 11 is a diagram depicting the portions of a present system useful for providing position data in the z-direction. FIG. 12 is a diagram depicting a manner in which a distance in the z-direction, a change in distance in the z-direction and a rotation about a z-axis can be determined. When an object moves towards the camera, its image size will change on the camera as shown in FIGS. 12 and 13. Thus, the distance z or distance change $\Delta_z$ can be calculated the following equations that are based on Equation 3:

$$z = f(1 - 1/M) \quad \text{Equation 5}$$

$$\Delta z = fh_0(1/h_{i2} - 1/h_{i1}) \quad \text{Equation 6}$$

where $h_0$ is the object size of the target, $h_{i1}$ is the image size when the target is disposed at a distance z away from the lens 44, $h_{i2}$ is the image size when the target is z−Δz away from the lens, f is the focal length and M is the magnification. It shall be noted that the second image 40 is greater than the first image 38, signifying that the two images are produced with objects disposed at different z distances from the image plane 30. Rotation $\theta_z$ can be directly obtained based on the image orientation on the camera as shown in FIG. 14.

In another example as shown in FIG. 15, a distance in the z-direction from the target plane 12 to the image plane 30 can be determined using the image size change. The target plane 12 is moved to three different locations with the corresponding sizes of target images on the image plane as:

$$d1 = 257 \text{ pixels} * 3.45 \text{ um} = 0.887 \text{ mm}$$

$$d2 = 388 \text{ pixels} * 3.45 \text{ um} = 1.339 \text{ mm}$$

$$d3 = 720 \text{ pixels} * 3.45 \text{ um} = 2.484 \text{ mm}$$

where the value 3.45 um is the pixel. Thus, the related optical magnification can be obtained as follows:

$$M1 = 0.887/9.4 \approx 0.0944$$

$$M2 = 1.339/9.4 \approx 0.1424$$

$$M3 = 2.484/9.4 \approx 0.2643$$

where the lens focal length f=25 mm. The distances in the z-direction can be calculated based on Equation 5 disclosed elsewhere herein:

$$z1 \approx 240 \text{ mm}$$

$$z2 \approx 150 \text{ mm}$$

$$z3 \approx 70 \text{ mm}$$

Again, the target rotation angle $\theta_z$ can be directly obtained from the reticle image rotation as shown in FIG. 15 where the image (D) in FIG. 15 shows $\theta_z = 45$ degrees.

FIG. 16 is a diagram depicting a present system adapted to a rail system including two ends, wherein a distance between the two ends of the rail system 14 is configured to be adjustable, the image plane of a camera 10 is disposed on a first end of the rail system and the target plane 12 is disposed on a second end of the rail system 14. The present system is fixed on the optical rails 60 while the target plane 12 can be translated and rotated. The two longer optical rails 60 are used to adjust z distance between the camera 10 and the target plane 12. A short optical rail 62 on the top end of the two long rails 60 is used to adjust translation in the x-direction. In one embodiment, these rails 60, 62 are equipped with rulers and protractors, e.g., graduation marks indicating distances and angles, facilitating the use of the rails and allowing confirmation of distance and angle changes. The target plane 12 is mounted on a kinematic mirror mount which can change its tip and tilt angles ($\theta_x$ and $\theta_y$) by using two adjustment knobs on the back. For $\theta_z$ adjustments, the target plane 12 can be rotated about a z-axis. The optical rails and angular adjustment screws are used to adjust the target's movement in six dimensions to yield a position described in x, y, z, $\theta_x$, $\theta_y$, and $\theta_z$. With the rail system 14, a target for which the six dimensions are required can be attached to the target plane 12 at a known positional offset in one or more of these six dimensions. This way, the six dimensions of the target can be computed as the target is attached to target plane at a positional offset. In one example and referring to FIGS. 10 and 16, the second circle or the larger of the circles is utilized for the ensuing measurements. The diameter of the circle, d, on camera sensor is about 255 pixels long obtained from a captured image. As the camera pixel size is 3.45 um, d=255×3.45 um=0.88 mm, the optical magnification of the camera can be calculated as M=0.88/9.4≈0.094. By capturing both images at the start and end point of the target translation, an image shift r of about 1800 pixels long can be obtained on the image plane 30 of the camera 10. Thus, r=1800×3.45 um=6.21 mm. The translation-related values, x and y values are as follows:

$x=r/M=66$ mm $y=0$ (along the rail)

These results can be confirmed using the rulers and protractors disposed on the rails 60, 62 and the target plane 12.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An optical position sensor for providing six-dimensional position and orientation data of a target plane comprising a reticle disposed thereon, in a three-dimensional (3D) space expressed in (a first distance x, a second distance y, a third distance z, a first angle of rotation θx, a second angle of rotation θy, a third angle of rotation θz), the target plane configured to be rotatable about an axis perpendicular to the target plane, said optical position sensor comprising:
   (a) a light source configured to emit a light beam in an x-direction, wherein said light source is laser;
   (b) a mirror comprising a mirror plane disposed in an x-y plane;
   (c) a beam splitter configured for reflecting said light beam from said light source disposed on a first side of said beam splitter onto said mirror disposed on a second side of said beam splitter before being directed to the target plane disposed on a third side of said beam splitter, said light beam reflected by the target plane onto said beam splitter before being directed through a lens to an image plane disposed on a fourth side of said beam splitter to form an image, said first side is opposingly disposed from said fourth side, said second side is opposingly disposed from said third side; and
   (d) a rail system comprising two ends, wherein a distance between said two ends of the rail system is configured to be adjustable, said image plane is disposed on a first end of said rail system and the target plane is disposed on a second end of said rail system,
   wherein in a known position and orientation of the target plane, said image is provided as a first image and in a second position and orientation of the target plane, said image is cast as a second image, the first distance (x) is determined based on an image shift of said second image from said first image in said x-direction and a magnification of said second image with respect to said first image, the second distance (y) is determined based on said image shift of said second image from said first image in a y-direction and said magnification of said second image with respect to said first image, the third distance (z) that is a distance between the target plane and said image plane along an axis perpendicular to said mirror plane is determined based on said magnification of said second image with respect to said first image, and each of the first angle of rotation (θx) and the second angle of rotation (θy) is determined based on a ratio of the x-component length and the y-component length of the second image relative to said first image and the third angle of rotation (θz) is determined based on a rotation of said second image with respect to said first image and the position and orientation data of the target plane is provided as the first distance x, the second distance y, the third distance z, the first angle of rotation θx, the second angle of rotation θy and the third angle of rotation θz.

2. The optical position sensor of claim 1, wherein said reticle comprises a first rectilinear line and a second rectilinear line disposed at a right angle to said first rectilinear line.

3. The optical position sensor of claim 1, wherein said reticle comprises a cross.

4. The optical position sensor of claim 1, further comprising a camera within which said lens and said image plane are disposed.

* * * * *